United States Patent
Li et al.

(10) Patent No.: US 12,234,804 B2
(45) Date of Patent: Feb. 25, 2025

(54) CLEARANCE MONITORING SYSTEM OF WIND TURBINE SET, AND MONITORING METHOD AND DEVICE

(71) Applicant: BEIJING GOLDWIND SCIENCE & CREATION WINDPOWER EQUIPMENT CO., LTD., Beijing (CN)

(72) Inventors: Xinle Li, Beijing (CN); Qi Zhang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 256 days.

(21) Appl. No.: 17/996,488

(22) PCT Filed: Mar. 31, 2021

(86) PCT No.: PCT/CN2021/084212
§ 371 (c)(1),
(2) Date: Oct. 18, 2022

(87) PCT Pub. No.: WO2021/218541
PCT Pub. Date: Oct. 4, 2021

(65) Prior Publication Data
US 2023/0204014 A1    Jun. 29, 2023

(30) Foreign Application Priority Data

Apr. 30, 2020 (CN) .......................... 202010364452.3

(51) Int. Cl.
*F03D 17/00*    (2016.01)
*F03D 80/00*    (2016.01)
*F03D 80/80*    (2016.01)

(52) U.S. Cl.
CPC ............ *F03D 17/00* (2016.05); *F03D 80/00* (2016.05); *F03D 80/82* (2016.05);
(Continued)

(58) Field of Classification Search
CPC .......... F03D 17/00; F03D 80/00; F03D 80/82; F05B 2270/33; F05B 2270/805; Y02E 10/72
See application file for complete search history.

(56) References Cited

U.S. PATENT DOCUMENTS 8,131,402 B2 * 3/2012 Neumann ............. F03D 1/0675
416/61
2008/0101930 A1    5/2008 Bosche
(Continued)

FOREIGN PATENT DOCUMENTS

| CN | 102384028 A | 3/2012 |
|---|---|---|
| CN | 109812390 A | 5/2019 |

(Continued)

OTHER PUBLICATIONS

CN110939549A English Translation (Year: 2020).*
(Continued)

*Primary Examiner* — Ryan D Walsh

(57) ABSTRACT

A clearance monitoring system of a wind turbine, and a monitoring method and device are provided. The clearance monitoring system includes a processor and a millimeter wave radar in communication connection to the processor. The millimeter wave radar is installed on a left side portion of a nacelle of the wind turbine. The millimeter wave radar points to a movement area of the impeller and is used for monitoring movement data of each blade on the impeller in the movement area. The processor is used to receive the
(Continued)

movement data. According to the movement data, blade clearance between each blade and a tower of the wind turbine is determined.

15 Claims, 7 Drawing Sheets

(52) U.S. Cl.
    CPC ..... *F05B 2270/33* (2013.01); *F05B 2270/805* (2013.01); *Y02E 10/72* (2013.01)

(56) References Cited

U.S. PATENT DOCUMENTS

| | | |
|---|---|---|
| 2011/0144815 A1 | 6/2011 | Neumann |
| 2018/0283352 A1 | 10/2018 | Williams et al. |

FOREIGN PATENT DOCUMENTS

| | | | | |
|---|---|---|---|---|
| CN | 110454334 A | 11/2019 | | |
| CN | 210003452 U | 1/2020 | | |
| CN | 110778452 A | 2/2020 | | |
| CN | 110927709 A | 3/2020 | | |
| CN | 110939549 A | 3/2020 | | |
| CN | 111963385 A | * 11/2020 | ............. | F03D 13/20 |
| EP | 2511523 A1 | 10/2012 | | |

OTHER PUBLICATIONS

CN-111963385-A English Translation (Year: 2020).*
The International Search Report mailed Jun. 16, 2021; PCT/CN2021/084212.
Chinese First Office Action dated Apr. 22, 2022; Appln. No. 202010364452.3.

* cited by examiner

CLEARANCE MONITORING SYSTEM OF WIND TURBINE SET, AND MONITORING METHOD AND DEVICE

This application is the national phase of International Application No. PCT/CN2021/084212, titled "CLEARANCE MONITORING SYSTEM OF WIND TURBINE SET, AND MONITORING METHOD AND DEVICE", filed on Mar. 31, 2021, which claims the benefit of priority to Chinese Patent Application No. 202010364452.3, titled "CLEARANCE MONITORING SYSTEM OF WIND TURBINE SET, AND MONITORING METHOD AND DEVICE", filed with the China National Intellectual Property Administration on Apr. 30, 2020, the entire disclosures of which are incorporated herein by reference.

FIELD

The present application relates to the technical field of control of wind power generation equipment, and in particular, to a monitoring system, a monitoring method and a monitoring apparatus for monitoring a clearance of a wind turbine.

BACKGROUND

Wind turbines are developing to become large-megawatt units. As the diameter of an impeller increases and the length of blades increases, the range of deflection variation of the blades during rotation of the impeller is larger, which causes a clearance area between a blade tip of each of the blades and a tower becomes more and more narrow. In a condition of strong wind, on one hand, a larger-diameter impeller enables the wind turbine to capture more wind energy, which leads to a higher wind-electricity conversion efficiency; on the other hand, for the wind turbine with a narrow clearance area, collision between blades and the tower easily occurs, resulting in a risk of damage to the wind turbine.

SUMMARY

A monitoring system, a monitoring method and a monitoring apparatus for monitoring a clearance of a wind turbine are provided according to embodiments of the present application.

In a first aspect, a clearance monitoring system for a wind turbine is provided according to an embodiment of the present application, including a processor and a millimeter-wave radar communicatively connected to the processor, where
  the millimeter-wave radar is configured to be mounted on a left side portion, viewed in a direction from a nacelle toward an impeller, of an outer side of the nacelle of the wind turbine, a detection direction of the millimeter-wave radar is directed to a lower left of a motion area where the impeller rotates around a central axis thereof, and the millimeter-wave radar is configured to monitor motion data of each of blades in the motion area; and
  the processor is configured to determine, based on the motion data, a blade clearance between each of the blades and a tower of the wind turbine.

In an implementation of the first aspect, the nacelle has a nacelle casing extending along an axial direction of the central axis of the impeller of the wind turbine, and the millimeter-wave radar is mounted on a nacelle side wall close to a nacelle top wall.

In combination with the first aspect and the above implementation, in an implementation of the first aspect, in a detection range of the millimeter-wave radar, a distance between a probe of the millimeter-wave radar and a blade tip ranges from 60 meters to 110 meters.

In combination with the first aspect and the above implementation, in an implementation of the first aspect, during the rotation of the impeller, the processor is configured to determine, based on the motion data, trail information of a blade tip moving toward the tower.

In combination with the first aspect and the above implementation, in an implementation of the first aspect,
  an angle between a detection centerline of the millimeter-wave radar and a first reference plane ranges from 20 degrees to 30 degrees;
  an angle between the detection centerline of the millimeter-wave radar and a second reference plane ranges from 15 degrees to 20 degrees; and
  an angle between the detection centerline of the millimeter-wave radar and a third reference plane ranges from 40 degrees to 50 degrees.

In combination with the first aspect and the above implementation, in an implementation of the first aspect,
  the first reference plane is parallel to the central axis of the impeller of the wind turbine and parallel to an axis of the tower;
  the second reference plane is perpendicular to the central axis of the impeller and parallel to the axis of the tower; and
  the third reference plane is perpendicular to the first reference plane and perpendicular to the second reference plane.

In a second aspect, a wind turbine is provided according to the present application, including the clearance monitoring system according to the first aspect of the present application.

In a third aspect, a clearance monitoring method for a wind turbine is provided according to the present application. The method is applied in the clearance monitoring system according to the first aspect of the present application. The clearance monitoring method includes:
  acquiring motion data, monitored by a millimeter-wave radar, of each of blades in a motion area where the blades rotate around a central axis of an impeller;
  determining, based on the motion data, trail information of a blade tip moving toward a tower; and determining, based on the trail information, a blade clearance between each of the blades and the tower.

In an implementation of the third aspect, the motion data includes a monitored angle of the blade tip of each of the blades relative to a detection centerline of the millimeter-wave radar, and a monitored distance of the blade tip of each of the blades relative to a geometric center of the millimeter-wave radar.

In a fourth aspect, a clearance monitoring apparatus for a wind turbine is provided according to the present application, including:
  an acquiring module, configured to acquire motion data, monitored by a millimeter-wave radar, of each of blades in a motion area where the blades rotate around a central axis of an impeller; and
  a distance measuring module, configured to determine, based on the motion data, a blade clearance between each of the blades and a tower.

In a fifth aspect, a non-transitory computer-readable storage medium is provided according to the present application, where the non-transitory computer-readable storage medium is configured to store computer instructions, and the computer instructions are configured to, when being executed, allow the clearance monitoring method for the wind turbine according to the third aspect of the present application to be implemented.

Additional aspects and advantages of the present application are set forth partially in the following description, which will become apparent from the following description, or will be learned by practice of the present application.

BRIEF DESCRIPTION OF THE DRAWINGS

The above and/or additional aspects and advantages of the present application will become apparent and readily understood from the following description of embodiments in conjunction with the accompanying drawings.

DETAILED DESCRIPTION OF THE EMBODIMENTS

Figure 1:
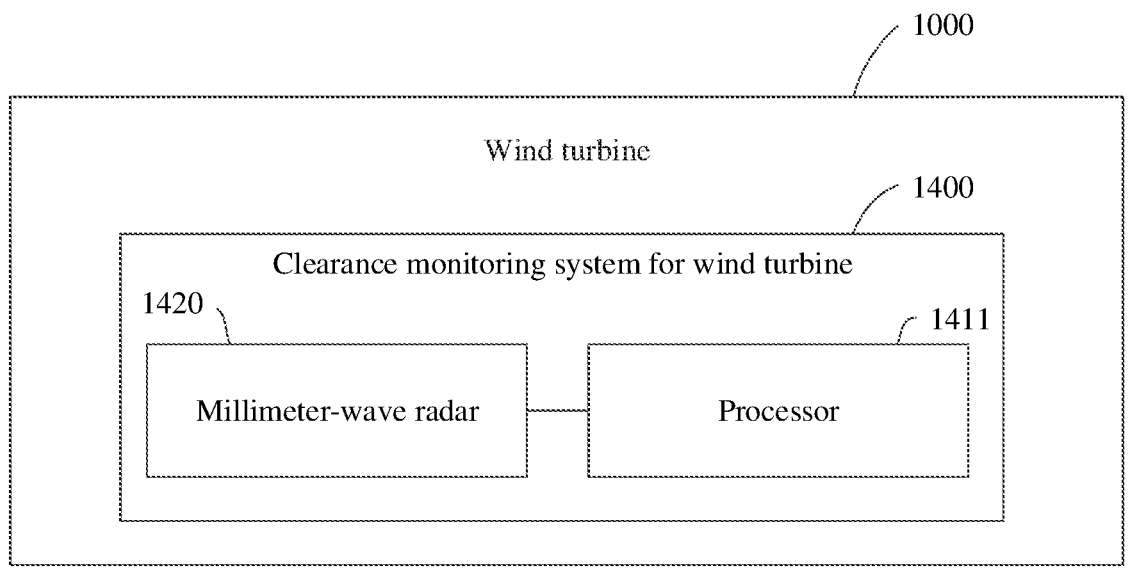
FIG. 1 is a schematic view of a structural frame of a wind turbine according to an exemplary embodiment.

The present application will be described in detail hereinafter, examples of embodiments of the present application are illustrated in drawings, in which the same or similar reference numerals represent the same or similar elements or elements with the same or similar functions throughout the description. In addition, if a detailed description of the known technology is unnecessary for the illustrated features of the present application, it will be omitted. The embodiments described hereinafter with reference to the drawings are only exemplary embodiments which are used to explain the present application, and should not be construed to limit the present application.

It should be understood by those skilled in the art that all terms (including technical and scientific terms) used herein have the same meaning as commonly understood by those ordinarily skilled in the technical field to which the present application belongs, unless otherwise defined. It should also be understood that terms such as those defined in a general dictionary should be understood to have the meaning consistent with that in the context of the art, and should not be interpreted in an idealized or overly formal sense unless specifically defined herein.

Those skilled in the art could understand that, unless explicitly stated, the singular forms used herein such as "a", "an", "said", and "the" are intended to include the plural forms. It should be further understood that, the terms "include/comprise" used in the description indicate the existence of the feature, integer, step, operation, element and/or component, which does not exclude the existence or addition of one or more of other features, integers, steps, operations, elements, components and/or combinations thereof. It should be understood that the term "and/or" used herein includes all or any unit or all combinations of one or more associated listed items.

In a wind turbine, an impeller includes a hub and three blades extending outward from the hub. The impeller rotates around a centerline of the impeller to drive a generator to operate, so as to convert wind energy into electrical energy. A clearance distance refers to a minimum distance between a blade tip of a blade and a surface of a tower when the blade passes the front of the tower during the process that the impeller rotates around the centerline of the impeller, which actually may be abstracted as an actual minimum distance from a motion trail curve of the blade tip to an outermost contour of the tower, and may be referred to as a clearance for short. In order to prevent the impeller of the wind turbine from colliding with the tower of the wind turbine during rotation, which causes an accident of destruction of the wind turbine, it is required to continuously monitor this parameter namely the clearance.

Technical solutions of the present application and how the above technical problems are solved by the technical solutions of the present application will be described in detail hereafter with specific embodiments. The following specific embodiments may be combined with each other, and the same or similar concepts or processes may not be repeated in some embodiments. Embodiments according to the present application are described hereinafter with reference to the drawings.

A clearance monitoring system 1400 for a wind turbine 1000 is provided according to an embodiment of a first aspect of the present application, as shown in FIG. 1, which includes a processor 1411 and a millimeter-wave radar 1420 communicatively connected to the processor 1411.

The millimeter-wave radar 1420 is mounted on a left side portion, viewed in a direction from a nacelle 1100 toward an impeller 1300, of an outer side of the nacelle 1100 of the wind turbine 1000. A detection direction of the millimeter-wave radar 1420 is directed to a motion area where the impeller rotates around a central axis of the impeller. The millimeter-wave radar 1420 is configured to monitor motion data of each of blades 1310 on the impeller 1300 in the motion area.

The processor 1411 is configured to receive the motion data, and determine a blade clearance between each of the blades 1310 and a tower 1200 of the wind turbine 1000 based on the motion data.

With the clearance monitoring system 1400 for the wind turbine 1000 according to the present application, the motion data of a blade tip 1311 moving toward the tower 1200 can be monitored through the millimeter-wave radar 1420 arranged on the left side portion of the nacelle 1100, then a clearance distance between the blade tip 1311 and the tower 1200 is accurately determined based on the motion data. The clearance monitoring system 1400 is not affected by bad weather, and thus all-weather clearance monitor can be realized.

In this embodiment, the blade tip 1311 refers to a portion located at the farthest end of the blade and having a length ranging from one-tenth to one-fifth of the full length of the blade. To accurately describe the position of the left side portion, viewed in the direction from the nacelle 1100 toward the impeller 1300, of an outer side of the nacelle 1100, "the left side portion of the nacelle" herein is defined as the left side portion of the nacelle when viewed in the direction from the nacelle toward the impeller.

Figure 15:
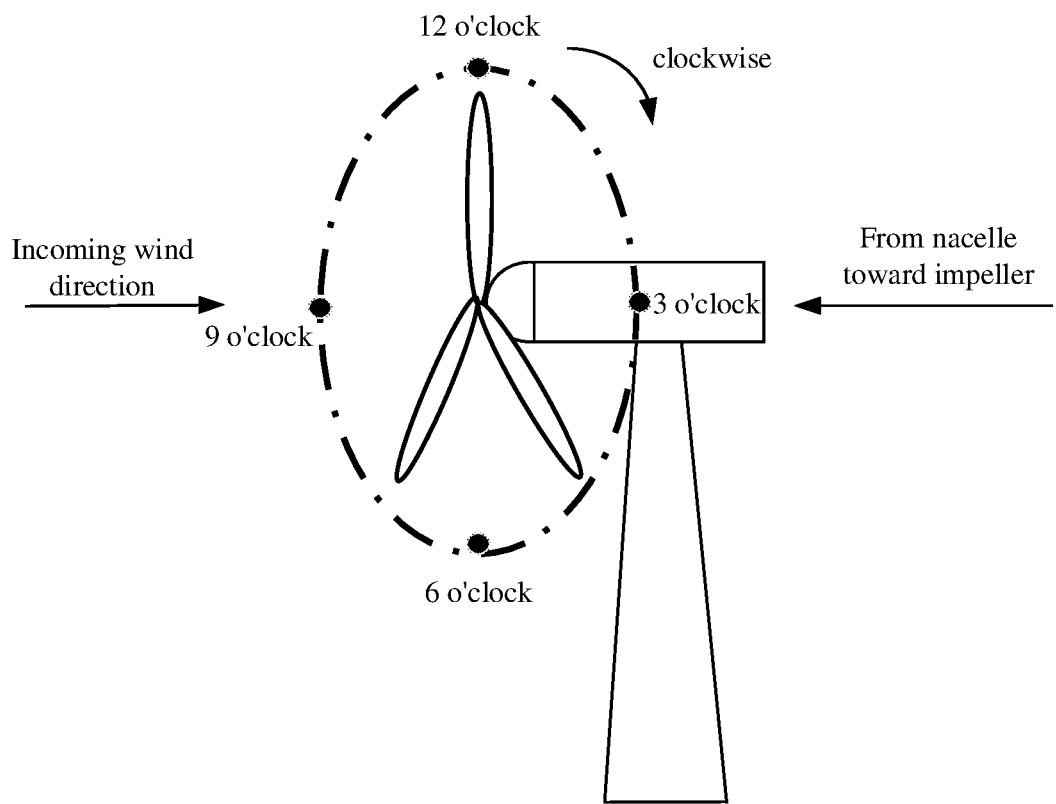
FIG. 15 is a schematic view showing a polar coordinate system according to the exemplary embodiment.

Reference is made to FIG. 15, the nacelle is abstracted as a mass point, and the mass point is taken as an origin of a polar coordinate system. A plane corresponding to the polar coordinate system is parallel to a plane in which the impeller rotates around the centerline of the impeller. Being viewed from an incoming wind direction toward the impeller, the blades rotate in a clockwise direction, a left direction of the nacelle is directed to the 3 o'clock position in the clockwise direction, a downward direction of the nacelle is directed to the 6 o'clock position in the clockwise direction, a right direction of the nacelle is directed to the 9 o'clock position in the clockwise direction, and an upward direction of the nacelle is directed to the 12 o'clock position in the clockwise direction.

In this embodiment, the "left side portion of the nacelle" may be defined, being viewed in a direction from the wind direction toward the impeller and with the nacelle being used as the origin of the polar coordinate system, as a position having a polar coordinate angle of about 3 o'clock at the outer side of the nacelle, which is where the millimeter-wave radar is arranged.

The millimeter-wave radar employed in this embodiment operates in a frequency domain ranging from 30 GHz to 300 GHz, and has a wavelength ranging from 1 mm to 10 mm. The wavelength of this frequency domain is between microwave and centimeter-wave. Therefore, the millimeter-wave radar has some advantages of both a microwave radar and a centimeter-wave radar. Compared with the centimeter-wave radar, the millimeter-wave radar has characteristics of small size, light weight and high spatial resolution. Compared with detection devices such as infrared device, laser device, and television, a millimeter-wave seeker has a high ability of penetrating fog, smoke, and dust, and has the characteristics of all-weather and all-day operation.

One of operation characteristics of the millimeter-wave radar lies in that the millimeter-wave radar is only sensitive to a speed of radial movement along the detection centerline. That is, in a case that a monitored object moves radially along the detection centerline, the millimeter-wave radar can determine the position of the monitored object; while in a case that the monitored object moves in a direction perpendicular to the detection centerline, the monitored object cannot be identified by the millimeter-wave radar. Another operation characteristic lies in that a radiation pattern of the millimeter-wave radar has a very small beam width, and only objects in a limited range may be detected.

Figure 2:
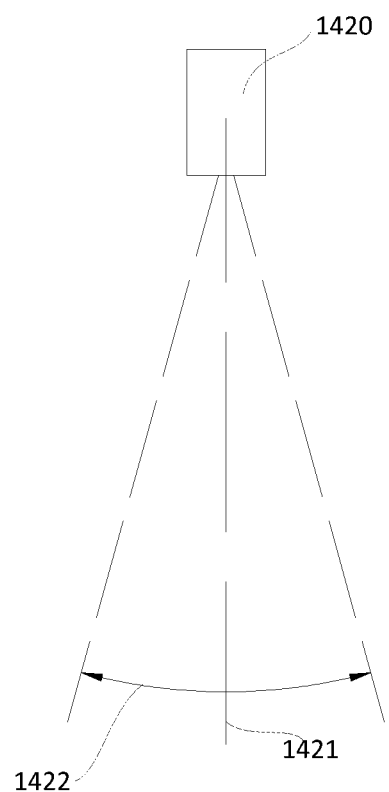
FIG. 2 is a schematic plan view showing a detection range of a millimeter-wave radar according to the exemplary embodiment.

In the present embodiment, as shown in FIG. 2, a detection area of the millimeter-wave radar is a conical area extending outward from a probe, and an included angle of the conical area is represented as a detection angle range 1422. The detection centerline 1421 of the millimeter-wave radar refers to an angle bisector of the detection angle range 1422 of the millimeter-wave radar, and a radiation direction refers to a propagation direction of a signal radiated by the millimeter-wave radar.

In order to accurately acquire the position of the blade tip 1311 in operation, an installation posture and an installation position of the millimeter-wave radar 1420 are required to be preset, so as to capture a velocity component of the radial movement of the blade tip 1311 of the blade 1310 along the detection centerline of the millimeter-wave radar 1420. When the wind turbine 1000 is in operation, the impeller 1300 including several blades 1310 is in a rotating state. The installation posture and the installation position of the millimeter-wave radar 1420 according to the present embodiment are set such that in a case that the blade 1310 enters the detection range of the millimeter-wave radar 1420, when the movement velocity of the blade tip 1311 has a radial component, it can be accurately perceived by the millimeter-wave radar 1420 so as to accurately determine the position of the blade tip 1311.

Figure 3:
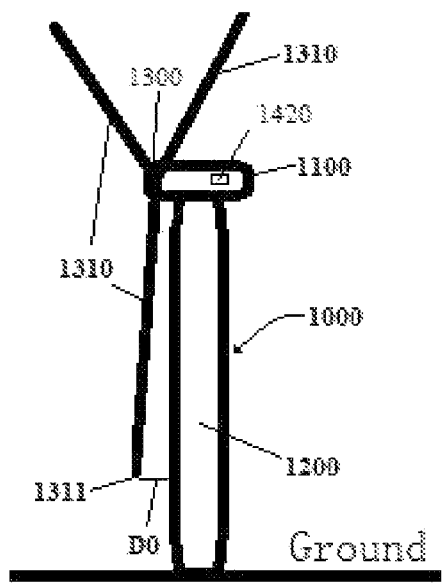
FIG. 3 is a schematic view showing the structure of a wind turbine according to the exemplary embodiment.

As shown in FIG. 3, the wind turbine 1000 specifically includes a tower 1200, a millimeter-wave radar 1420, a nacelle 1100, an impeller 1300 and other components, and the impeller 1300 may include several blades 1310. FIG. 3 shows a situation where the impeller 1300 includes three blades 1310. DO in FIG. 3 represents a distance between a blade tip 1311 of a blade 1310 closest to the tower 1200 and the tower 1200, that is, a clearance distance between the blade 1310 and the tower 1200.

Figure 4:
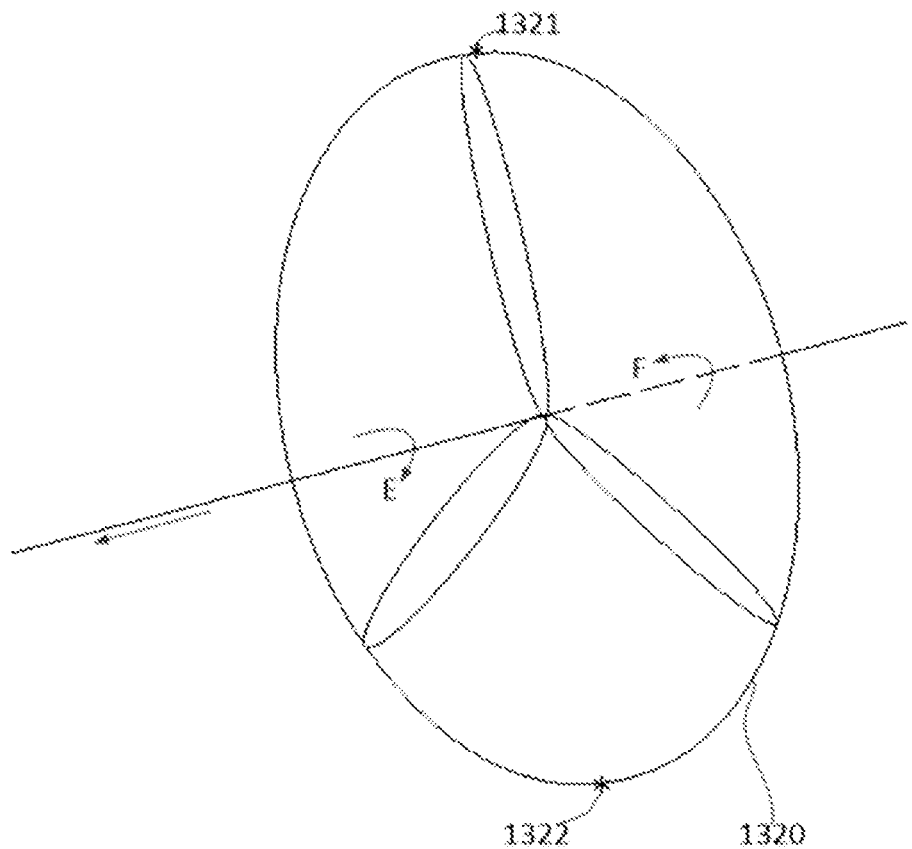
FIG. 4 is a schematic view showing a motion trail of blades according to the exemplary embodiment.

Specifically, the millimeter-wave radar 1420 is arranged at an outer side of the nacelle 1100 of the wind turbine 1000. In order to monitor a motion trail of the blade tip 1311 moving toward the tower 1200, instead of monitoring a motion trail of the blade tip 1311 moving away from the tower 1200, the millimeter-wave radar 1420 is arranged at a side portion of the nacelle 1100. As shown in FIG. 4, a blade 1310 on the impeller 1300 moves from an uppermost position 1321 to a lowermost position 1322 of the motion area, and a trail area 1320 is formed by sweeping of the blade, and the side portion of the nacelle 1100 corresponding to the trail area 1320 is the side portion, where the millimeter-wave radar 1420 is arranged, of the nacelle 1100. Taking the direction from the nacelle 1100 toward the impeller 1300 as the front, that is, the direction pointed by an arrow on a straight line in FIG. 4; the direction from the nacelle 1100 toward the ground is a downward direction in default. If the impeller 1300 of the wind turbine 1000 rotates clockwise, which may be referred to a rotation direction E in FIG. 4, the above trail area is at the left side of the nacelle 1100. If the impeller 1300 of the wind turbine 1000 rotates counterclockwise during operation, which may be referred to a rotation direction F in FIG. 4, the above trail area is at the right side of the nacelle 1100. Generally, the impeller 1300 of the wind turbine 1000 rotates clockwise during operation, and thus the millimeter-wave radar 1420 is mounted on the left side portion, viewed from the nacelle toward the impeller 1300, on the nacelle 1100 of the wind turbine 1000.

Figure 5:
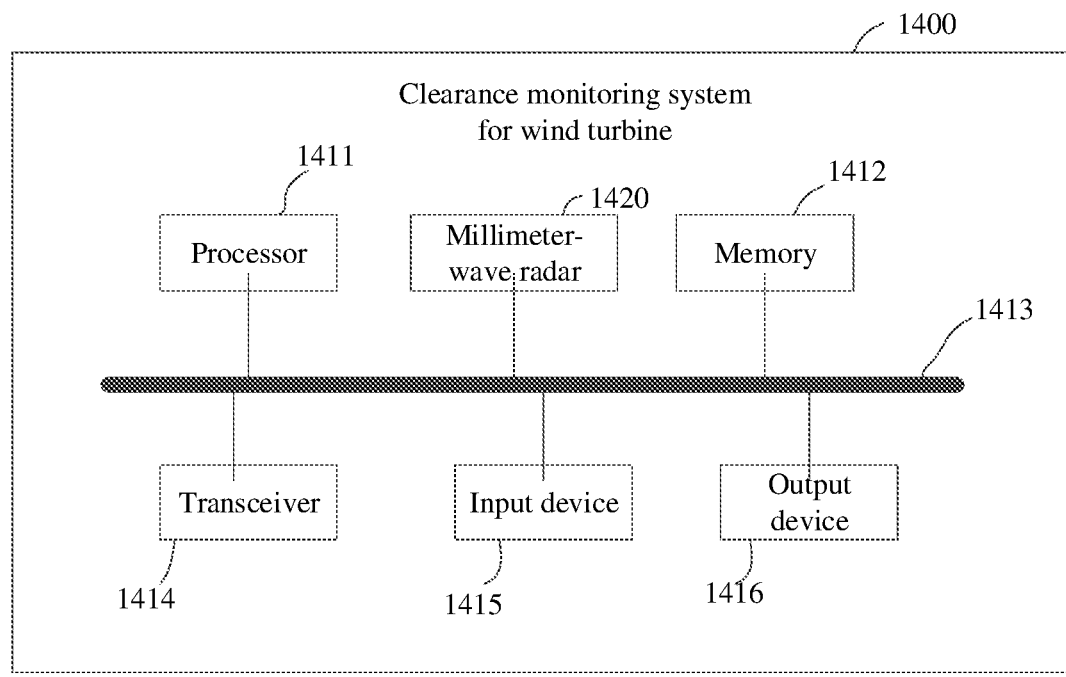
FIG. 5 is a schematic structural diagram of a clearance monitoring system for the wind turbine according to the exemplary embodiment.

A clearance monitoring system 1400 for a wind turbine 1000 is provided according to an optional embodiment of the present application. As shown in FIG. 5, the clearance monitoring system 1400 for the wind turbine 1000 shown in FIG. 5 includes a processor 1411, a memory 1412 and a millimeter-wave radar 1420. The processor 1411 and the memory 1412 are electrically connected to each other, for example through a bus 1413. The millimeter-wave radar 1420 is electrically connected to the processor 1411 through the bus 1413.

The processor 1411 may be a central processing unit (CPU), a general-purpose processor, a digital signal processor (DSP), an application specific integrated circuit (ASIC), a field-programmable gate array (FPGA) or other programmable logic devices, transistor logic devices, hardware components, or any combination thereof. The processor 1411 may implement or execute the various exemplary logical block diagrams, modules and circuits described in connection with the disclosure of the present application. The processor 1411 may also be a combination that realizes computing functions, such as a combination of one or more microprocessors, a combination of a DSP and a microprocessor, and the like.

The bus 1412 may include a channel via which information is transmitted between the above components. The bus 1412 may be a peripheral component interconnect (PCI) bus, an extended industry standard architecture (EISA) bus, or the like. The bus 1412 may be divided into an address bus, a data bus, a control bus, or the like. For ease of representation, only one bold line is used to represent the bus in FIG. 5, but it does not mean that there is only one bus or only one type of bus.

The memory 1413 may be a read-only memory (ROM) or other types of static storage devices that can store static information and instructions, or a random access memory (RAM) or other types of dynamic storage devices that can store information and instructions. The memory 1413 may also be an electrically erasable programmable read-only memory (EEPROM), a compact disc read-only memory (CD-ROM) or other storage media such as optical disks, discs (including compact discs, laser discs, discs, digital versatile discs, blue-ray discs, etc.), magnetic discs or other magnetic storage devices, or any other media that can be used to carry or store desired program codes in the form of instructions or data structures and can be accessed by computers, which is not limited herein.

Optionally, the clearance monitoring system 1400 may further include a transceiver 1414. The transceiver 1414 may be configured for the reception and transmission of signals. The transceiver 1414 may allow the clearance monitoring system 1400 to communicate with other devices wirelessly or by wire to exchange data. It should be noted that, in practical implementation, the number of transceiver 1414 is not limited to one.

Optionally, the clearance monitoring system 1400 may further include an input device 1415. The input device 1415 may be configured to receive inputted numbers, characters, images, and/or sound information, or to generate signal input related to user settings and functional control of the clearance monitoring system 1400. The input device 1415 may include, but is not limited to, one or more of a touch screen, a physical keyboard, a function key (such as a volume control key or a switch key), a trackball, a mouse, a joystick, a camera, a sound pick-up, and the like.

Optionally, the clearance monitoring system 1400 may further include an output device 1416. The output device 1416 may be configured to output or display information processed by the processor 1411. The output device 1416 may include, but is not limited to, one or more of a display device, a speaker, a vibration device, and the like.

Although FIG. 5 illustrates the clearance monitoring system 1400 provided with various devices, it should be understood that not all of the illustrated devices are required to be implemented or included. Alternatively, more or fewer devices may be implemented or included.

Optionally, the memory 1412 is configured to store application codes for executing solutions according to the present application, and the execution is controlled by the processor 1411. The processor 1411 is configured to execute application codes stored in the memory 1412, so as to implement any one of the clearance monitoring methods for the wind turbine 1000 according to embodiments of the present application, and the clearance monitoring methods are described in detail hereinafter in specific embodiments of the present application.

Figure 6:
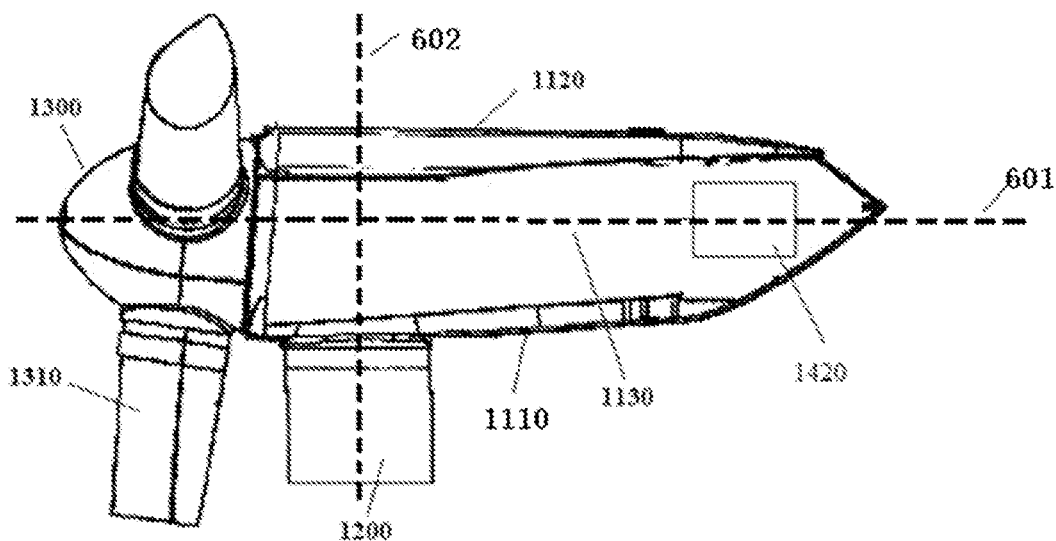
FIG. 6 is a schematic view showing a position where the millimeter-wave radar is mounted on the wind turbine according to the exemplary embodiment.

Feasibly, in an implementation of the above embodiment, as shown in FIG. 6, the nacelle 1100 has a nacelle casing extending along the central axis 601 of the impeller 1300 of the wind turbine 1000, and the nacelle includes a nacelle bottom wall 1110 close to the tower 1200, a nacelle top wall 1120 away from the tower 1200 and a nacelle side wall 1130 connecting the nacelle bottom wall 1110 and the nacelle top wall 1120. The millimeter-wave radar 1420 is mounted on the nacelle side wall 1130 close to the nacelle top wall 1120. A cross section, parallel to a plane in which the impeller is located, of the nacelle 1100 of the wind turbine 1000 is generally polygonal, the millimeter-wave radar 1420 is mounted on the left side portion, viewed from the nacelle to the impeller 1300, of the nacelle 1100 and is close to the nacelle top wall 1120. That is, the millimeter-wave radar 1420 is relatively far away from the impeller 1300, hence, a detection field as large as possible can be obtained in a case that the detection range of the millimeter-wave radar 1420 is relatively narrow, so as to fully detect the motion data of the blade tip 1311 of the blade 1310. The processor 1411 determines a blade clearance between the blade 1310 and the tower of the wind turbine based on the motion data. Due to the all-weather and all-day characteristics of the millimeter-wave radar 1420, the clearance monitoring system 1400 can realize all-weather clearance monitoring, thus improving the data integrity of monitoring a clearance condition. Further, a detection angle of the millimeter-wave radar 1420 should allow that, during the process that the blade tip rotates around the central axis 601 of the impeller from the uppermost position 1321 of the motion area to the lowermost position 1322, a radical velocity component of the blade tip 1311 along the detection centerline of the millimeter-wave radar 1420 in an area close to the tower can be identified. Thus, in the circular motion of the blade tip toward the tower, a warning is given in advance in the area where the blade tip is close to the tower, so as to prevent the blade tip from colliding with the tower.

Feasibly, in an implementation of the present application, the detection direction of the millimeter-wave radar is directed to the lower left of a motion area where the impeller rotates around the central axis. Specifically, an angle between the detection centerline of the millimeter-wave radar 1420 and a first reference plane is a first angle, an angle between the detection centerline of the millimeter-wave radar 1420 and a second reference plane is a second angle, and an angle between the detection centerline of the millimeter-wave radar 1420 and a third reference plane is a third angle. The first reference plane is parallel to the central axis 601 of the impeller 1300 of the wind turbine 1000 and parallel to the axis 602 of the tower 1200. The second reference plane is perpendicular to the central axis 601 of the impeller 1300 and parallel to the axis 602 of the tower 1200. The third reference plane is perpendicular to the first reference plane and perpendicular to the second reference plane.

As mentioned above, based on operation characteristics of the millimeter-wave radar 1420 itself and the requirement for accurately measurement of the clearance between the blade 1310 and the tower 1200, the posture of the millimeter-wave radar 1420 can be set appropriately. The posture of the millimeter-wave radar 1420 on the nacelle 1100 may be specifically determined based on the first angle, the second angle and the third angle, and specific values of the first angle, the second angle and the third angle may be determined based on data such as the height of the tower 1200 and the length of the blade 1310 of the wind turbine 1000.

In order to accurately understand the above angle data, it can be understood through the following examples and accompanying drawings.

Figure 7:
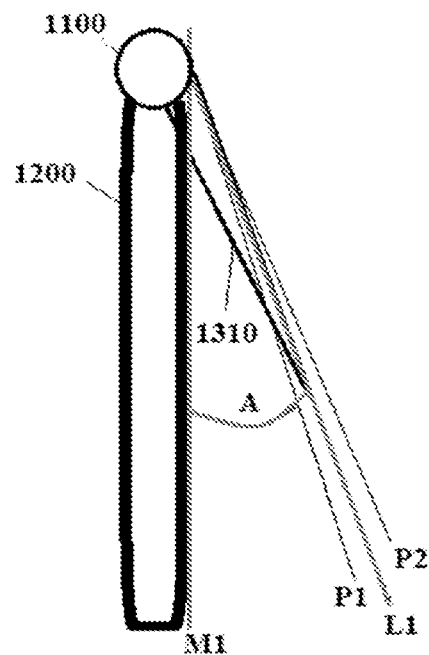
FIG. 7 is a structural front view of the wind turbine according to the exemplary embodiment.
Figure 8:
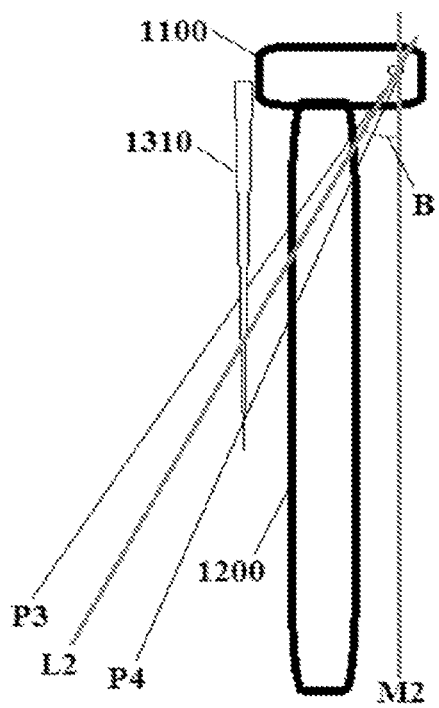
FIG. 8 is a structural side view of the wind turbine according to the exemplary embodiment.
Figure 9:
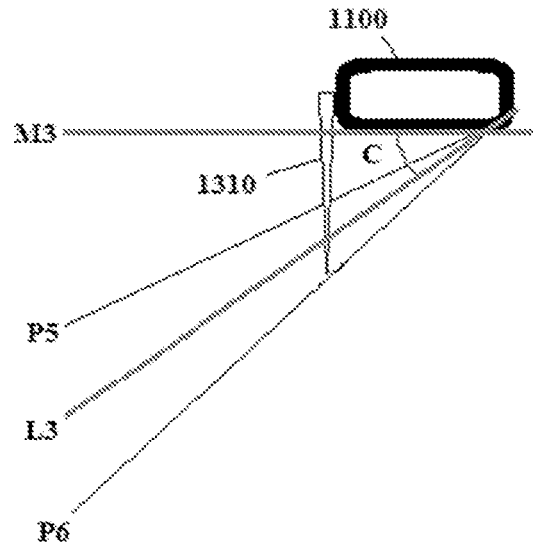
FIG. 9 is a structural top view of the wind turbine according to the exemplary embodiment.

As shown in FIG. 7 to FIG. 9, FIG. 7 is defined as a front view of the wind turbine 1000, and the front view is viewed in a direction facing the impeller 1300 of the wind turbine 1000. In the front view, the structure of the wind turbine 1000 is represented as a schematic structural view on the second reference plane as described above. M1 represents a projection of the first reference plane on the second reference plane, a straight line L1 represents a projection of the detection centerline of the millimeter-wave radar 1420 on the second reference plane, a range between a ray P1 and a ray P2 represents a projection of a monitoring range of the millimeter-wave radar 1420 on the second reference plane, and an angle A between M1 and L1 is the first angle. In one example, the angle A ranges from 20 degrees to 30 degrees.

FIG. 8 is a side view of the wind turbine 1000. In the side view, the structure of the wind turbine 1000 is represented as a schematic structural view, as being projected on the first reference plane described above. M2 represents a projection of the second reference plane on the first reference plane, a straight line L2 represents a projection of the detection centerline of the millimeter-wave radar 1420 on the first reference plane, a range between a ray P3 and a ray P4 represents a projection of a monitoring range of the millimeter-wave radar 1420 on the first reference plane, an angle B between M2 and L2 is the second angle. In one example, the angle B ranges from 15 degrees to 20 degrees.

FIG. 9 is a top view of the wind turbine 1000. In the top view, M3 represents a projection of the first reference plane on the third reference plane, a straight line L3 represents a projection of the detection centerline of the millimeter-wave radar 1420 on the third reference plane, a range between a ray P5 and a ray P6 represents a projection of a monitoring range of the millimeter-wave radar 1420 on the third reference plane, and an angle C between M3 and L3 is the third angle. In one example, the angle C ranges from 40 degrees to 50 degrees.

In the installation manner shown in FIG. 7 to FIG. 9, a straight-line distance between the probe of the millimeter-wave radar 1420 and the blade tip 1311 ranges from 60 meters to 110 meters.

In the present application, the detection direction of the millimeter-wave radar 1420 is directed to the lower left of the motion area where the impeller 1310 rotates around the centerline 601 when viewed from the nacelle toward the impeller. Since the blade clearance is below the nacelle 1100, and the plane where the motion area of the impeller 1310 is located is parallel to the polar coordinate plane with the nacelle being taken as the origin of the polar coordinate system as described above. The lower left of the motion area of the impeller 1310 is also the lower left of the nacelle. The millimeter-wave radar 1420 in operation monitors a motion trail of the blade tip moving toward the tower 1200 in the trail area 1320 when the blade tip rotates around the center axis 601 of the impeller, rather than a motion trail of the blade tip 1311 moving away from the tower 1200, which realizes advanced warning before the blade tip collides with the tower. A wind turbine including the clearance monitoring system as described in the preceding embodiments is provided according to embodiments of a second aspect of the present application.

Figure 10:
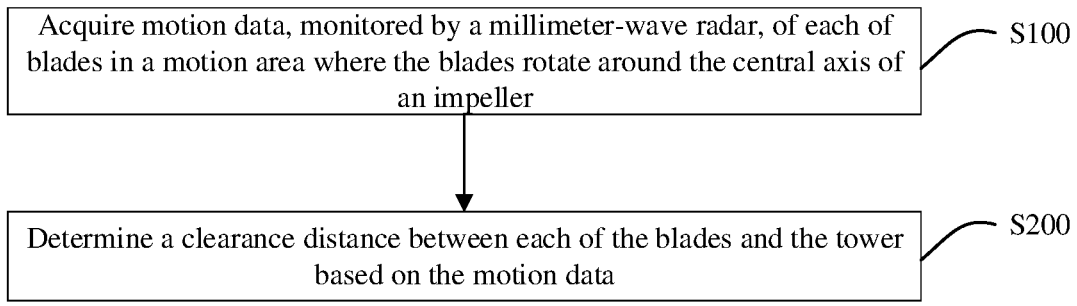
FIG. 10 is a schematic flowchart of a clearance monitoring method for a wind turbine according to an exemplary embodiment.

In order to realize all-weather accurate monitoring of the clearance of the wind turbine 1000, a clearance monitoring method for a wind turbine 1000 is provided according to an embodiment of a third aspect of the present application, which is applied in any one of the clearance monitoring systems 1400 for a wind turbine 1000 as described in the embodiments of the first aspect of the present application. As shown in FIG. 10, the clearance monitoring method includes following steps.

S100, acquiring motion data of each of blades 1310 in a motion area where the blades 1310 rotate around the central axis 601 of the impeller monitored by the millimeter-wave radar 1420.

S200, determining a clearance distance between each of the blades 1310 and the tower 1200 based on the motion data.

Firstly, the clearance monitoring system 1400 acquires the motion data of each of the blades 1310 via the millimeter-wave radar 1420, and then accurately determines, based on the motion data, the clearance distance between each of the blades 1310 and the tower 1200 during the rotation of the impeller. As described above, the clearance of the blade is a distance between the blade tip 1311 of each of the blades 1310 on the impeller 1300 of the wind turbine 1000 and the tower 1200.

With the clearance monitoring method for a wind turbine 1000 according to the present application, the operation characteristics of the millimeter-wave radar 1420 can be fully used, and the motion data of the blades 1310 continuously rotating toward the tower 1200 is monitored by the millimeter-wave radar 1420 appropriately arranged on the left side portion of the nacelle 1100, and then clearance distance between the blades 1310 and the tower 1200 is sufficiently determined based on the motion data. The clearance monitoring method has a high sensitivity and is less affected by a bad weather, which can realize all-weather clearance monitoring, thereby improving the data integrity of clearance monitoring.

Figure 11:
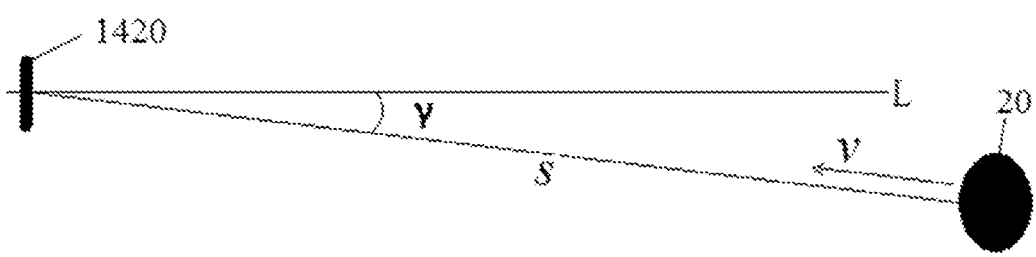
FIG. 11 is a schematic view showing monitored parameters of the millimeter-wave radar according to the exemplary embodiment.

Feasibly, in an implementation of the embodiment of the third aspect of the present application, as shown in FIG. 11, the motion data specifically includes the following items: a monitored angle of the blade tip 1311 of each of the blades 1310 relative to the detection centerline of the millimeter-wave radar 1420, and a monitored distance of the blade tip 1311 of each of the blades 1310 relative to the center of the probe of the millimeter-wave radar 1420. The center of the probe represents a mass point of the millimeter-wave radar 1420, which is a starting point where a detection signal line start to be transmitted. The above is description of various position parameters in the present application in an abstract manner. Since the millimeter-wave radar in actual conditions necessarily has a certain geometric shape, the center of the probe may be equivalent to the geometric center of the millimeter-wave radar.

The step of acquiring the motion data of each of blades 1310 in the motion area of the blades 1310 monitored by the millimeter-wave radar 1420 specifically includes:

measuring multiple monitored angles and multiple monitored distances corresponding to the monitored angles based on a predetermined collection frequency. In FIG. 11, the monitored angle is represented as γ, and the monitored distance is represented as S.

Since a radiation pattern of the millimeter-wave radar 1420 has a small beam width, only a monitored object 20 within a limited angle range near the detection centerline may be clearly perceived. The monitored object may be the blade tip 1311 of the blade 1310. Moreover, the millimeter-wave radar is only sensitive to a radial velocity along the detection centerline. In an example, when a blade 1310 rotates into the range of the radiation pattern of the millimeter-wave radar 1420, a radial velocity component v of the blade tip 1311 of the blade 1310 within the range increases, then the blade 1310 passes a critical point and then gradually leaves the range of the radiation pattern of the millimeter-wave radar 1420, hence the radial velocity component v in the range gradually decreases. Therefore, the radial velocity component v of the blade tip 1311 has a maximum value within the range. According to an operation principle of the millimeter-wave radar 1420, for the blade tip 1311 at the maximum value of the radial velocity component, the millimeter-wave radar 1420 can clearly determine the position of the blade tip 1311 to the greatest extent. According to the above principle, the position of the millimeter-wave radar 1420 on the nacelle 1100 of the wind turbine 1000 is predetermined, and the motion data of the blade tip 1311 is acquired to clearly monitor the motion trail of the blade tip 1311 moving toward the tower.

Figure 12:
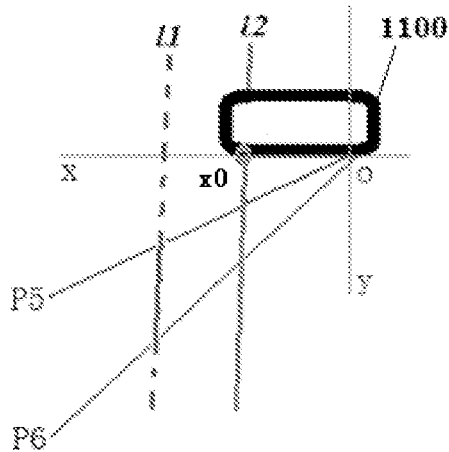
FIG. 12 is a schematic view showing a motion trail of a blade tip according to the exemplary embodiment.

As shown in FIG. 12, in order to calculate the clearance distance between the blade 1310 and the tower 1200, a distance between the motion trail of the blade tip 1311 and the outermost contour line of the tower 1200 is actually to be calculated. The tower 1200 is a stable structure with known boundary dimensions. Therefore, the tower 1200 is abstracted as a straight line $l_2$, or even a mass point. For example, with a geometric center of the tower 1200 being used to represent the tower 1200, a distance between the geometric center of the tower 1200 and the motion trail of the blade tip 1311 can be calculated. In fact, due to the limitation of the detection angle of the millimeter-wave radar, the motion trail of the blade tip 1311 cannot be completely acquired. Only a line segment $l_1$, close to the tower 1200, of the motion trail of the blade tip 1311 can be detected. The blade clearance between the blade 1310 and the tower 1200 can be obtained based on a distance between the line segment $l_1$ and the straight line $l_2$ where the tower 1200 is located which is also a distance between $l_1$ and the geometric center $(x_0,0)$ of the tower 1200. Through the above processes, a spatial ranging model can be changed into a plane ranging model, which facilitates calculation of the blade clearance.

At least two points are required to determine the above line segment. In the present application, data of multiple points are collected based on a predetermined collection frequency, and these points are obtained by monitoring the blade tip 1311 in a motion state at the same position point via the millimeter-wave radar 1420 in a stationary state. In actual situations, the wind speed is always changing, although the monitored data are corresponding to the same position point, two adjacent times of monitoring results are not the same. Therefore, a line segment that can represent the motion trail of the blade tip 1311 can be determined based on two pieces of monitoring data with different data values. With the predetermined collection frequency, a monitored angle and a monitored distance collected each time correspond to each other, and a set of data of the monitored angle and the monitored distance is embodied as the monitored angle and the monitored distance corresponding to the monitored angle.

Figure 13:
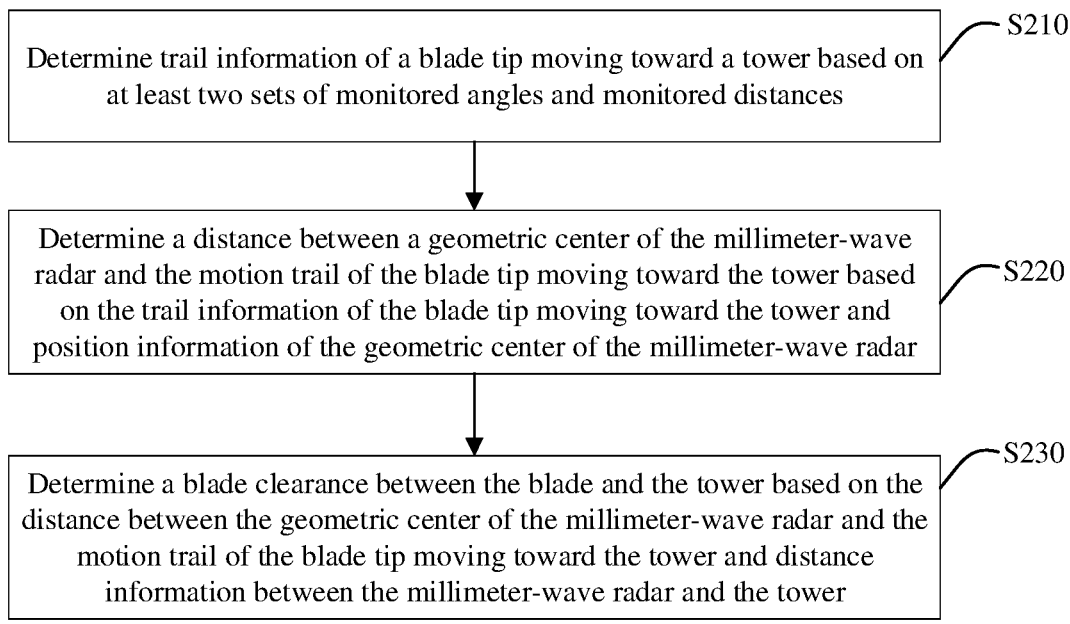
FIG. 13 is a schematic flowchart of a method for determining a blade clearance between each of blades and a tower based on motion data according to the exemplary embodiment.

Feasibly, in an implementation of the embodiment of the third aspect of the present application, the step of determining the blade clearance between each of blades 1310 and the tower 1200 based on the motion data, as shown in FIG. 13, includes the following steps.

S210, determining, based on at least two sets of monitored angles and monitored distances, trail information of the blade tip 1311 moving toward the tower.

S220, determining, based on the trail information of the blade tip 1311 moving toward the tower and position information of the geometric center of the millimeter-wave radar 1420, a distance between the geometric center of the millimeter-wave radar 1420 and the trail information of the blade tip 1311 moving toward the tower.

S230, determining the blade clearance between the blade 1310 and the tower 1200 based on the distance between the geometric center of the millimeter-wave radar 1420 and the motion trail of the blade tip 1311 moving toward the tower and distance information between the millimeter-wave radar 1420 and the tower 1200.

The original data acquired by the millimeter-wave radar 1420 (i.e., the monitored angle γ and the monitored distance S) is two pieces of polar coordinate data in a polar coordinate system with the geometric center of the millimeter-wave radar 1420 being taken as the origin. In order to facilitate the calculation of the distance between the line segment and the geometric center, polar coordinate data is converted into plane coordinate data. Then, the distance between the geometric center of the millimeter-wave radar 1420 and the motion trail of the blade tip 1311 moving toward the tower is determined based on the trail information of the blade tip 1311 moving toward the tower in the plane coordinate system and the position information of the geometric center of the millimeter-wave radar 1420. Since the distance information between the geometric center of the millimeter-wave radar 1420 and the tower 1200 is known and determined, the blade clearance can be determined based on the distance between the geometric center of the millimeter-wave radar 1420 and the motion trail of the blade tip 1311 moving toward the tower.

Feasibly, in an implementation of the embodiment of the present application, the specific method of determining, based on the coordinate data of the blade tip 1311 in the polar coordinate system, information of the straight line where the blade tip 1311 is located in the corresponding plane coordinate system is as follows. Determining the trail information of the blade tip 1311 moving toward the tower based on at least two sets of monitored angles and monitored distances in S210 includes the following steps.

The blade tip 1311 coordinate information in the plane coordinate system of the blade tip 1311 of each of the blades 1310 is determined based on each monitored angle and each monitored distance, as well as the second angle and the third angle. A plane where the plane coordinate system is located is the third reference plane, the origin of the plane coordinate system is the geometric center of the millimeter-wave radar 1420, a first coordinate axis of the plane coordinate system is parallel to a rotation axis of the impeller 1300, and a second coordinate axis of the plane coordinate system is perpendicular to the rotation axis of the impeller 1300.

The trail information of the blade tip 1311 moving toward the tower is determined based on all of the coordinate information of the blade tip 1311 in a predetermined time period.

As shown in FIG. 12, the geometric center of the millimeter-wave radar 1420 is taken as the origin O, a ray passing through the origin and parallel to the rotation axis of the impeller 1300 is taken as the first coordinate axis, which is determined as the X axis, and a ray passing through the origin O and perpendicular to the rotation axis of the impeller 1300 is taken as the second coordinate axis, which is determined as the Y axis, and thus an XOY plane coordinate system is formed. The position data of the blade tip 1311, monitored by the millimeter-wave radar 1420, originally belonging to the polar coordinate system are converted according to a coordinate system transform method in mathematics, to determine coordinate data of the position data of the blade tip 1311 in the above XOY plane coordinate system. The transform method may employ the following formula (1) and formula (2):

$$x = S \cdot \sin(\gamma) \cdot \sin(B) \cdot \cos(C), \qquad \text{formula (1);}$$

$$y = S \cdot \sin(\gamma) \cdot \sin(B) \cdot \sin(C), \qquad \text{formula (2);}$$

where, x represents a horizontal ordinate of the blade tip 1311 in the XOY plane coordinate system, y represents a vertical ordinate of the blade tip 1311 in the XOY plane coordinate system, γ represents the monitored angle in the position data of the blade tip 1311, S represents the monitored distance in the position data of the blade tip 1311, B represents the second angle, and C represents the third angle.

A virtual straight line which can reflect the position of the motion trail of the blade tip 1311 moving toward the tower is determined based on several coordinates of the blade tip 1311 acquired within a predetermined time period.

Figure 14:
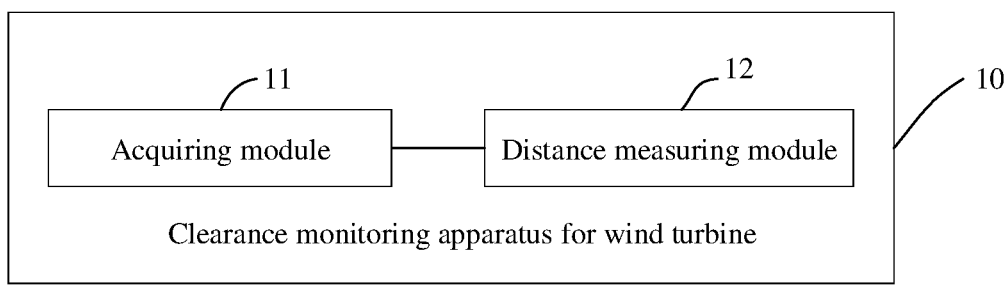
FIG. 14 is a schematic view showing a structural frame of a clearance monitoring apparatus for a wind turbine according to an exemplary embodiment.

Based on the same inventive concept, a clearance monitoring apparatus 10 for a wind turbine 1000 is provided according to an embodiment of the fourth aspect of the present application, which specifically includes an acquiring module 11 and a distance measuring module 12, as shown in FIG. 14.

The acquiring module 11 is configured to acquire motion data, monitored by a millimeter-wave radar 1420, of each of blades 1310 in a motion area where the blades 1310 rotates around a central axis 601 of an impeller. The distance measuring module 12 is configured to determine a blade clearance between each of the blades 1310 and a tower 1200 based on the motion data.

With the clearance monitoring apparatus for the wind turbine 1000 according to the present application, the clearance distance between the blade 1310 and the tower 1200 can be fully determined based on the monitored motion data of the blades 1310 continuously rotating on the tower 1200. The monitoring is less affected by a bad weather, and all-weather clearance monitoring can be realized, thus improving the data integrity of clearance monitoring.

Feasibly, the motion data acquired by the acquiring module 11 includes a monitored angle of the blade tip 1311 of each of the blades 1310 relative to a detection centerline of the millimeter-wave radar 1420, and a monitored distance of the blade tip 1311 of each of the blades 1310 relative to a geometric center of the millimeter-wave radar 1420. The step of acquiring, by the acquiring module 11, the motion data of each of blades 1310 in the motion area of the blades 1310 monitored by the millimeter-wave radar 1420 specifically includes measuring, based on a predetermined collection frequency, multiple monitored angles and multiple monitored distances corresponding to the monitored angles.

Feasibly, the step of determining, by the distance measuring module 12, the blade clearance between each of the blades 1310 and the tower 1200 based on the motion data specifically includes determining a straight line where the blade tip 1311 is located based on at least two sets of monitored angles and monitored distances. The monitored distance between the geometric center of the millimeter-wave radar 1420 and the straight line where the blade tip 1311 is located is determined based on information of the straight line where the blade tip 1311 is located and the position information of the geometric center of the millimeter-wave radar 1420. The blade clearance between the blade 1310 and the tower 1200 is determined based on the monitored distance between the geometric center of the millimeter-wave radar 1420 and the straight line where the blade tip 1311 is located and a distance information between the millimeter-wave radar 1420 and the tower 1200.

Feasibly, determining, by the distance measuring module 12, the information of the straight line where the blade tip 1311 is located based on at least two sets of monitored angles and monitored distances includes determining the blade tip 1311 coordinate information of the blade tip 1311 of each of the blades 1310 in the plane coordinate system based on each set of monitored angle and monitored distance, as well as the second angle and the third angle. The plane where the plane coordinate system is located is the third reference plane, the origin of the plane coordinate system is the geometric center of the millimeter-wave radar 1420, the first coordinate axis of the plane coordinate system is parallel to the rotation axis of the impeller 1300, and the second coordinate axis of the plane coordinate system is perpendicular to the rotation axis of the impeller 1300. The information of the straight line where the blade tip 1311 is located is determined based on all the coordinate information of the blade tip 1311 in the predetermined time period.

Based on the same inventive concept, a non-transitory computer-readable storage medium for storing computer instructions is provided according to an embodiment of the present application. When the computer instructions are executed, the clearance monitoring method for the wind turbine according to any one of the solutions of the third aspect of the present application is implemented. By applying the embodiments of the present application, at least the following advantageous effects can be achieved: all-weather clearance monitoring is realized, and the data integrity of monitoring of clearance conditions is improved.

Those skilled in the art should understand that the steps, measures, and solutions in the various operations, methods, and processes that have been discussed in this application can be alternated, modified, combined, or deleted. Furthermore, other steps, measures, and solutions having the various operations, methods, and processes that have been discussed in this application can also be alternated, modified, rearranged, divided, combined, or deleted. Furthermore, the steps, measures, and solutions having the various operations, methods, and processes disclosed in this application can also be alternated, modified, rearranged, divided, combined, or deleted.

The terms "first" and "second" are only used for descriptive purposes, and should not be construed as indicating or implying relative importance or implicitly indicating the number of technical features referred to. Thus, the features defined by "first", "second" and the like may explicitly or impliedly include one or more the features. In the description of the present application, the word "multiple" indicates two or more unless otherwise specified.

It should be understood that although the steps in the flowchart of the accompanying drawings are shown in an order indicated by arrows, these steps are not necessarily performed in the order as indicated by the arrows. Unless explicitly stated herein, the execution of these steps is not strictly limited to the order and may be performed in other orders. Moreover, at least part of the steps in the flowchart of the accompanying drawings may include multiple sub steps or phases, which are not necessarily executed at the same time, they can be executed at different times instead, and the execution sequence is not necessarily sequential, instead, they can be executed in turn or alternatively with other steps or at least part of the sub steps or phases of other steps.

Those described above are only some embodiments of the present application. It should be noted that, for those skilled in the art, several improvements and modifications may also be made without departing from the principle of the application. These improvements and modifications should also be included in the scope of protection of the present application.

REFERENCE NUMERALS IN THE DRAWINGS

| | |
|---|---|
| 10 clearance monitoring apparatus for wind turbine, | |
| 20 monitored object, | |
| 11 acquiring module, | 12 distance measuring module, |
| 1000 wind turbine, | 1100 nacelle, |
| 1200 tower, | 1300 hub, |
| 1400 clearance monitoring system for wind turbine, | |
| 1110 nacelle bottom wall, | 1120 nacelle top wall, |
| 1130 nacelle side wall, | |
| 1310 blade, | 1311 blade tip, |
| 1320 trail area, | 1321 uppermost position, |
| 1322 lowermost position, | |
| 1411 processor, | 1412 memory, |
| 1413 bus, | 1414 transceiver, |
| 1415 input device, | 1416 output device, |
| 1420 millimeter-wave radar, | 1421 detection centerline, |
| 1422 detection range. | |

The invention claimed is:

1. A clearance monitoring system for a wind turbine, comprising:
a processor and a millimeter-wave radar communicatively connected to the processor, wherein
a nacelle of the wind turbine has a nacelle casing extending along a central axis of an impeller of the wind turbine, the nacelle casing comprises a nacelle bottom wall close to a tower of the wind turbine, a nacelle top wall away from the tower and a nacelle side wall connecting the nacelle bottom wall and the nacelle top wall, wherein the millimeter-wave radar is configured to be mounted on the nacelle side wall close to the nacelle top wall, and be located on a left side portion, viewed in a direction from the nacelle toward the impeller, of an outer side of the nacelle of the wind turbine, a detection direction of the millimeter-wave radar is directed to a lower left of a motion area where the impeller rotates around the central axis thereof, and the millimeter-wave radar is configured to monitor motion data of each blade in the motion area; and the processor is configured to determine, based on the motion data, a blade clearance between each of the blades and the tower of the wind turbine.

2. The clearance monitoring system according to claim 1, wherein in a detection range of the millimeter-wave radar, a distance between a probe of the millimeter-wave radar and a blade tip ranges from 60 meters to 110 meters.

3. A wind turbine, comprising the clearance monitoring system according to claim 2.

4. The clearance monitoring system according to claim 1, wherein during the rotation of the impeller, the processor is configured to determine, based on the motion data, trail information of a blade tip moving toward the tower.

5. A wind turbine, comprising the clearance monitoring system according to claim 4.

6. The clearance monitoring system according to claim 1, wherein
an angle between a detection centerline of the millimeter-wave radar and a first reference plane ranges from 20 degrees to 30 degrees;
an angle between the detection centerline of the millimeter-wave radar and a second reference plane ranges from 15 degrees to 20 degrees; and
an angle between the detection centerline of the millimeter-wave radar and a third reference plane ranges from 40 degrees to 50 degrees.

7. The clearance monitoring system according to claim 6, wherein
the first reference plane is parallel to the central axis of the impeller of the wind turbine and parallel to an axis of the tower;
the second reference plane is perpendicular to the central axis of the impeller and parallel to the axis of the tower; and
the third reference plane is perpendicular to the first reference plane and perpendicular to the second reference plane.

8. A wind turbine, comprising the clearance monitoring system according to claim 1.

9. A clearance monitoring method for a wind turbine, comprising:
acquiring motion data, monitored by a millimeter-wave radar, of each blade in a motion area where the blades rotate around a central axis of an impeller, wherein a nacelle of the wind turbine has a nacelle casing extending along the central axis of the impeller of the wind turbine, the nacelle casing comprises a nacelle bottom wall close to a tower of the wind turbine, a nacelle top wall away from the tower and a nacelle side wall connecting the nacelle bottom wall and the nacelle top wall, wherein the millimeter-wave radar is configured to be mounted on the nacelle side wall close to the nacelle top wall, and be located on a left side portion, viewed in a direction from the nacelle toward the impeller, of an outer side of the nacelle of the wind turbine, and a detection direction of the millimeter-wave radar is directed to a lower left of the motion area where the impeller rotates around the central axis thereof;
determining, based on the motion data, trail information of a blade tip moving toward the tower; and
determining, based on the trail information, a blade clearance between each of the blades and the tower.

10. The clearance monitoring method according to claim 9, wherein the motion data comprises:
a monitored angle of the blade tip of each of the blades relative to a detection centerline of the millimeter-wave radar, and a monitored distance of the blade tip of each of the blades relative to the millimeter-wave radar.

11. The clearance monitoring method according to claim 10, wherein
the trail information of the blade tip moving toward the tower is determined based on at least two sets of monitored angles and monitored distances.

12. A non-transitory computer-readable storage medium, wherein the non-transitory computer-readable storage medium is configured to store computer instructions, and the computer instructions are configured to, when being executed, allow the clearance monitoring method for the wind turbine according to claim 11 to be implemented.

13. A non-transitory computer-readable storage medium, wherein the non-transitory computer-readable storage medium is configured to store computer instructions, and the computer instructions are configured to, when being executed, allow the clearance monitoring method for the wind turbine according to claim 10 to be implemented.

14. A non-transitory computer-readable storage medium, wherein the non-transitory computer-readable storage medium is configured to store computer instructions, and the computer instructions are configured to, when being executed, allow the clearance monitoring method for the wind turbine according to claim 9 to be implemented.

15. A clearance monitoring apparatus for a wind turbine, comprising:
an acquiring module, configured to acquire motion data, monitored by a millimeter-wave radar of each blade in a motion area where the blades rotate around a central axis of an impeller, wherein a nacelle of the wind turbine has a nacelle casing extending along the central axis of the impeller of the wind turbine, the nacelle casing comprises a nacelle bottom wall close to a tower of the wind turbine, a nacelle top wall away from the tower and a nacelle side wall connecting the nacelle bottom wall and the nacelle top wall, wherein the millimeter-wave radar is configured to be mounted on the nacelle side wall close to the nacelle top wall, and be located on a left side portion, viewed in a direction from the nacelle toward the impeller, of an outer side of the nacelle of the wind turbine, a detection direction of the millimeter-wave radar is directed to a lower left of the motion area where the impeller rotates around the central axis thereof; and
a distance measuring module, configured to determine, based on the motion data, a blade clearance between each of the blades and the tower.

* * * * *